June 13, 1950 J. M. WALLING 2,511,184
AUTOMATIC VALVE TIMER
Filed May 2, 1947 7 Sheets-Sheet 6
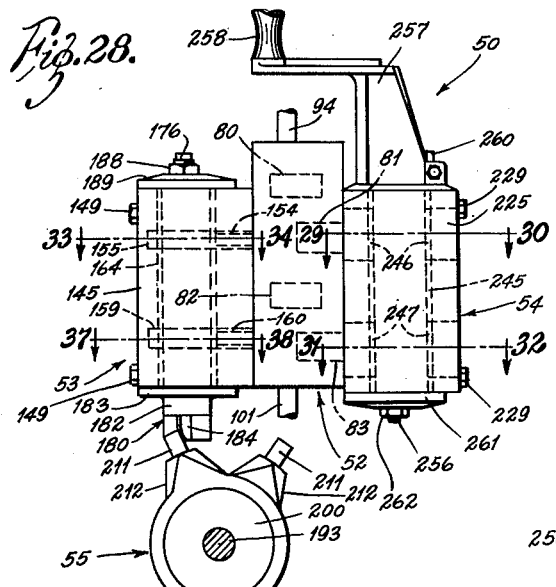
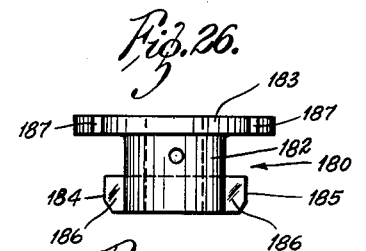
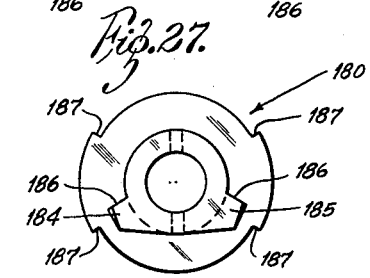
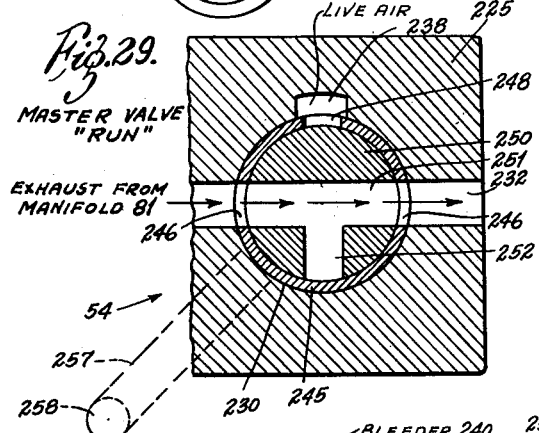
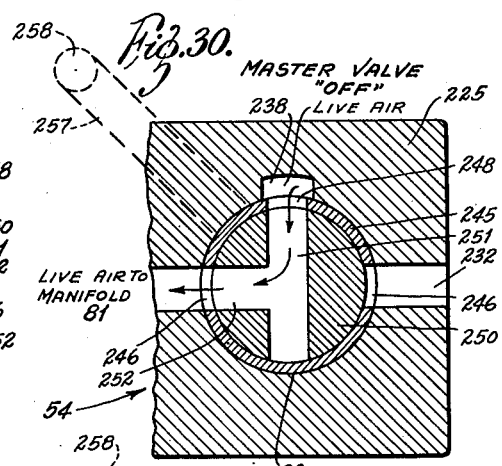
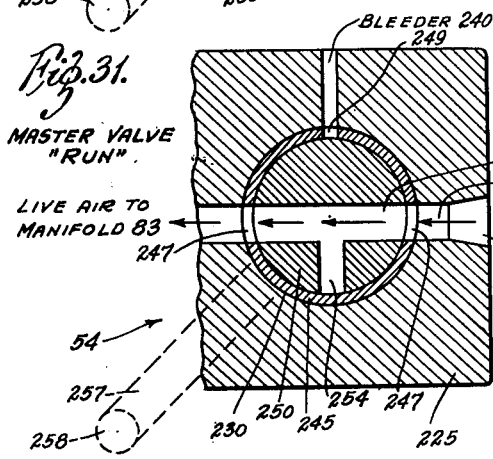
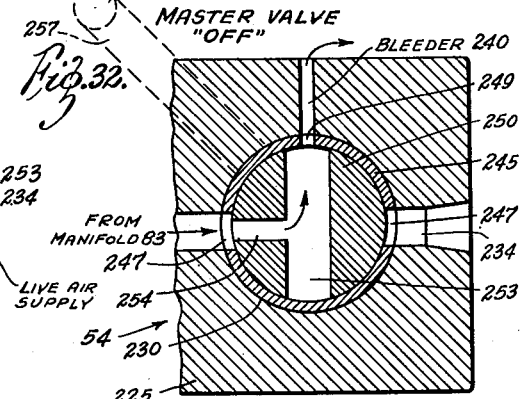
INVENTOR:
JOSEPH M. WALLING,
BY Kingsland, Rogers & Ezell
ATTORNEYS.

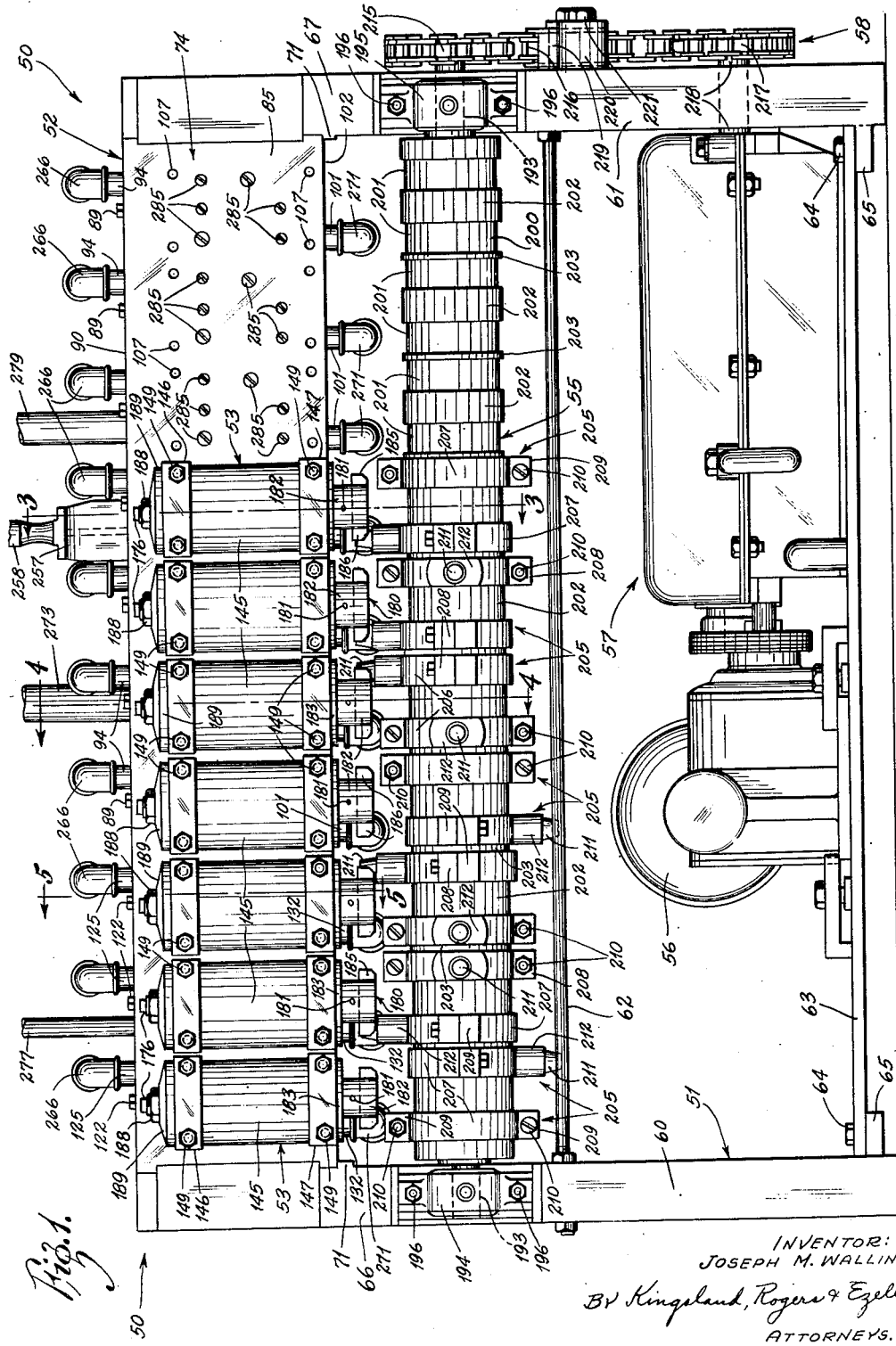

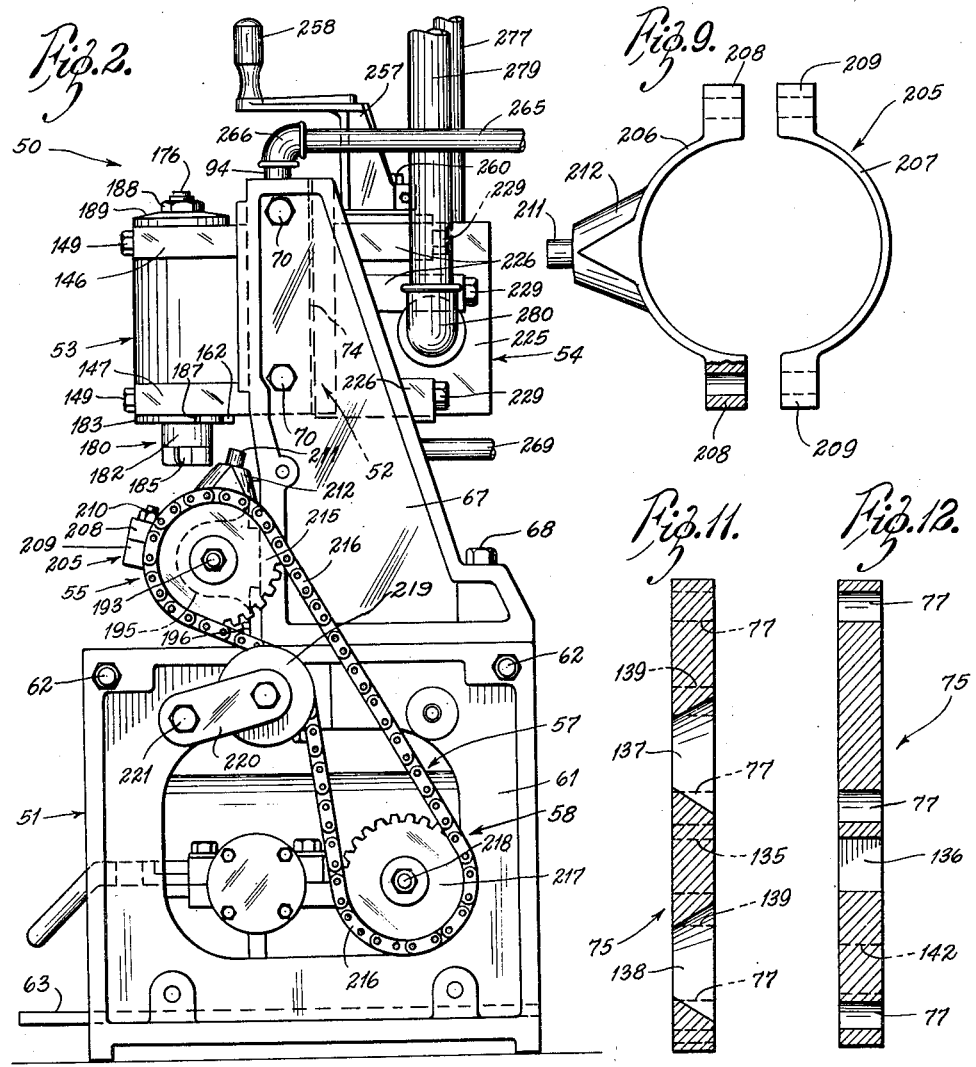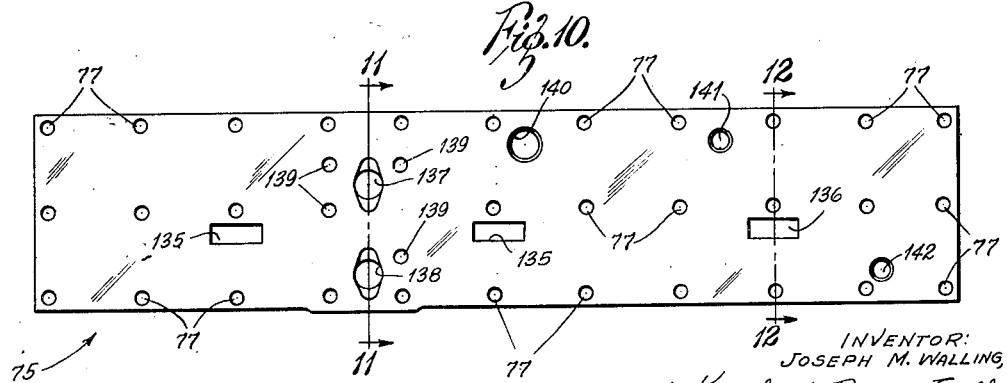

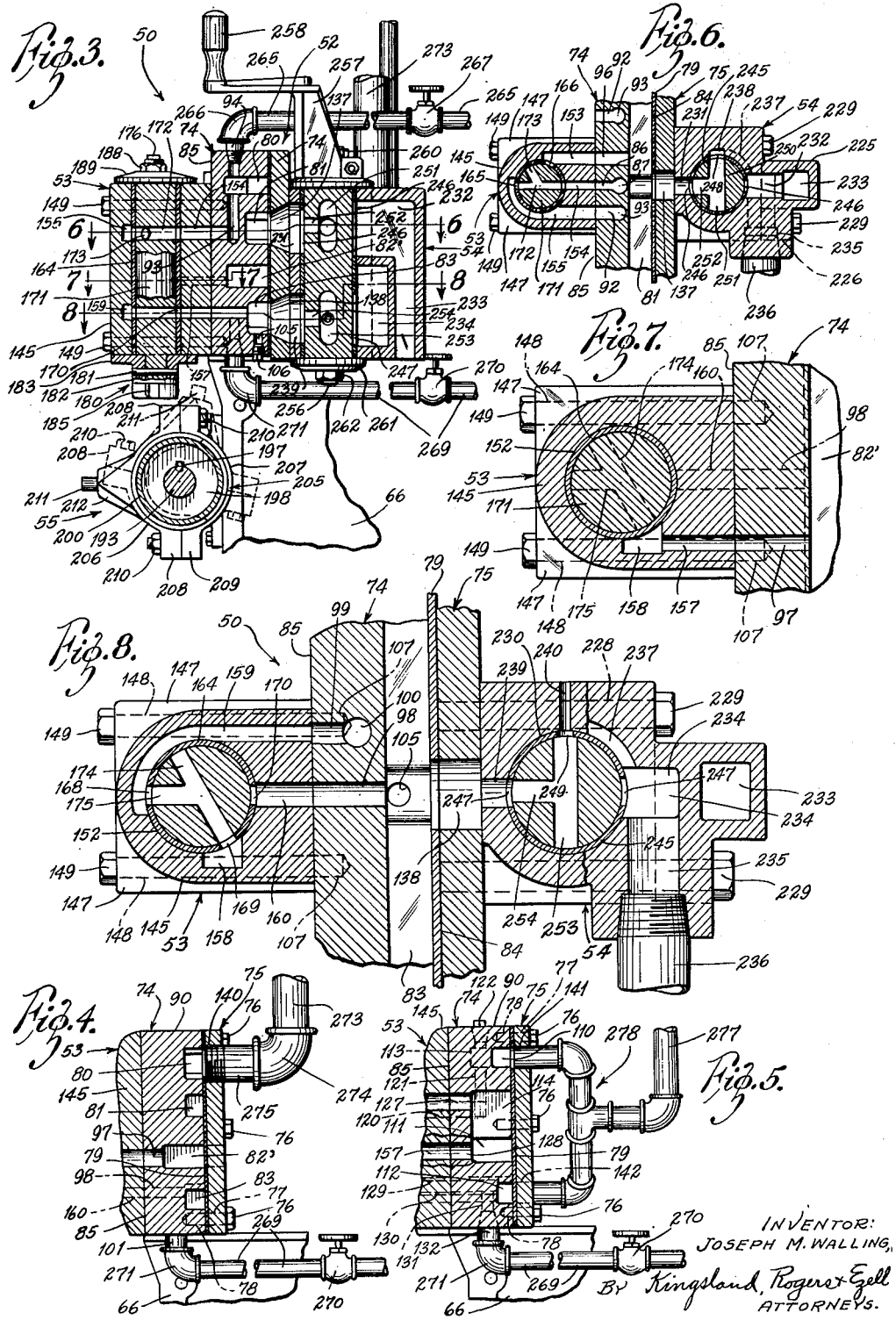

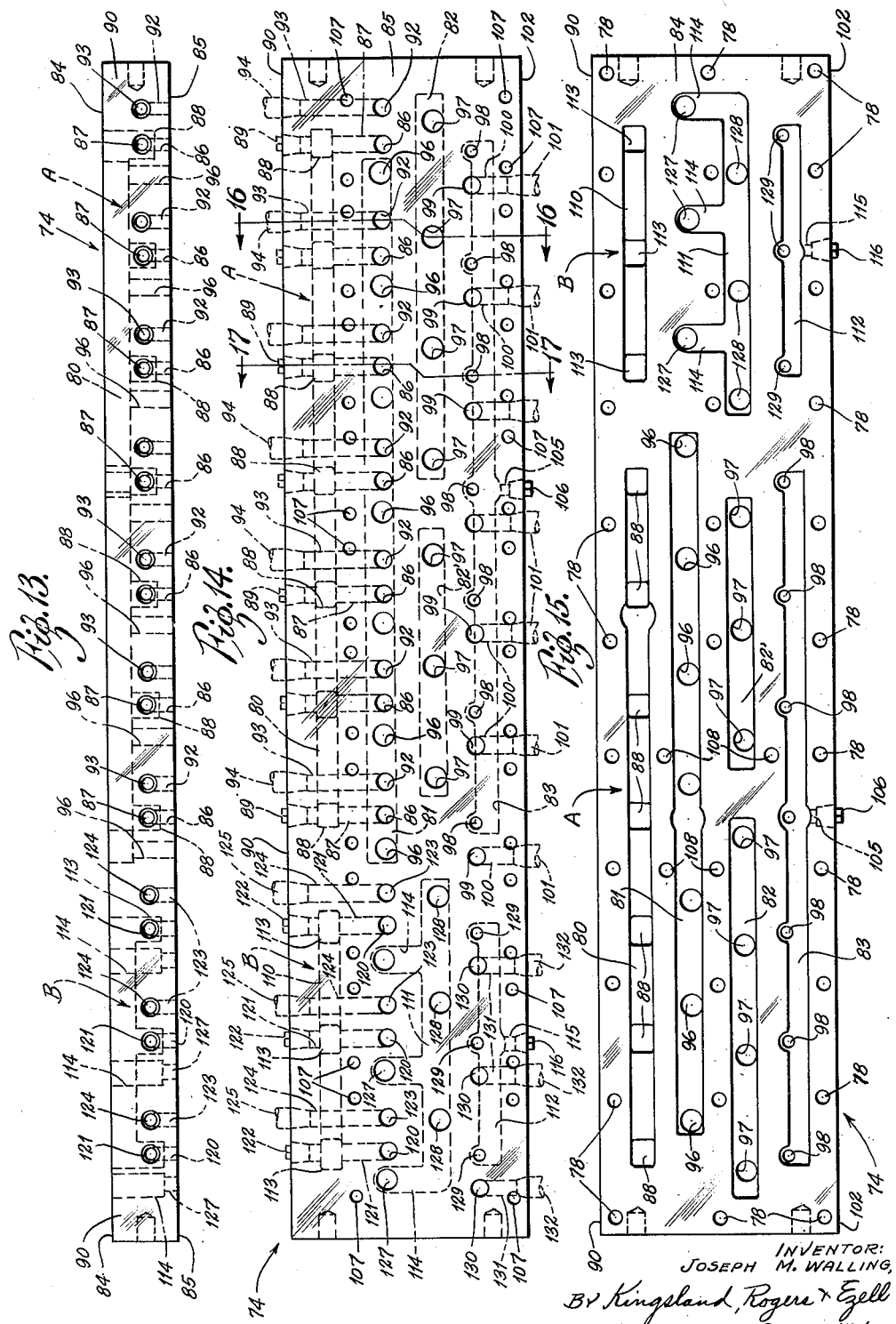

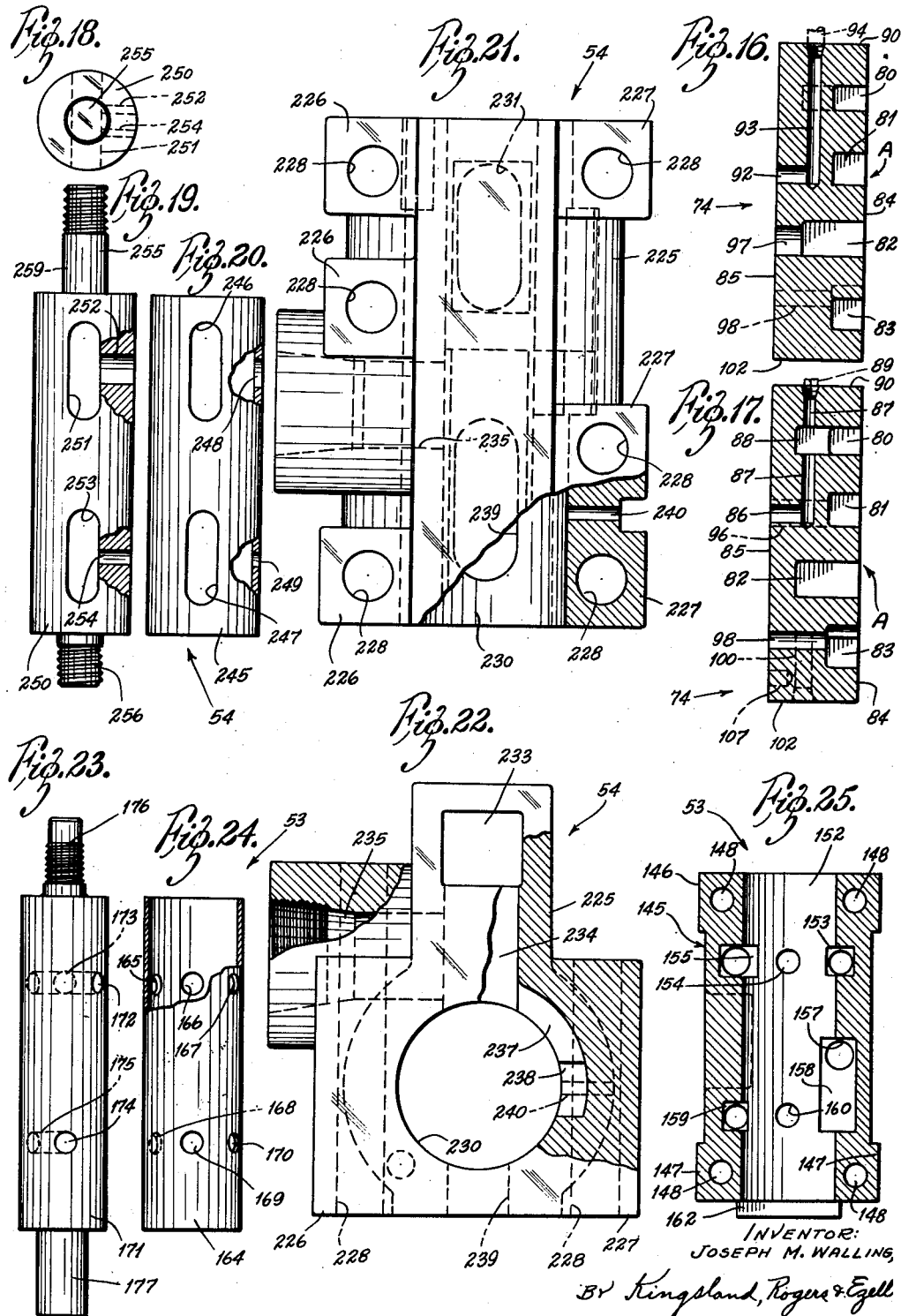

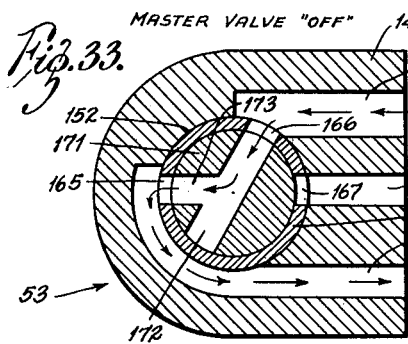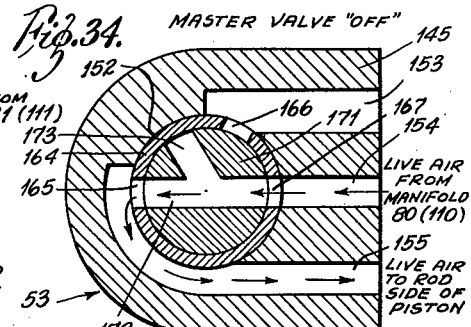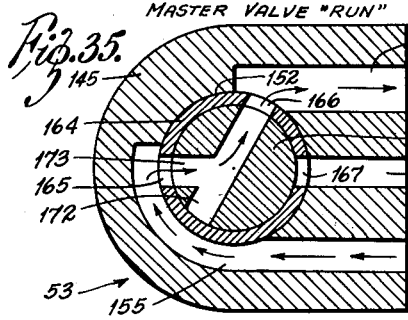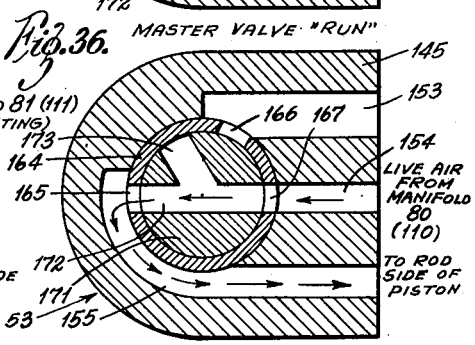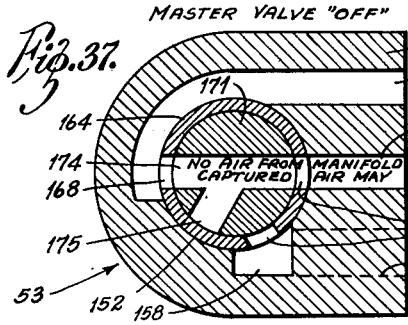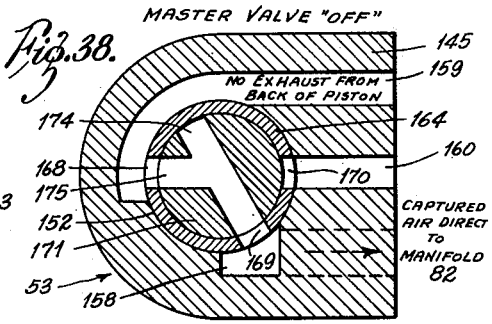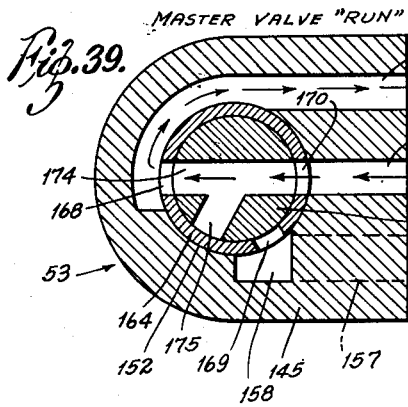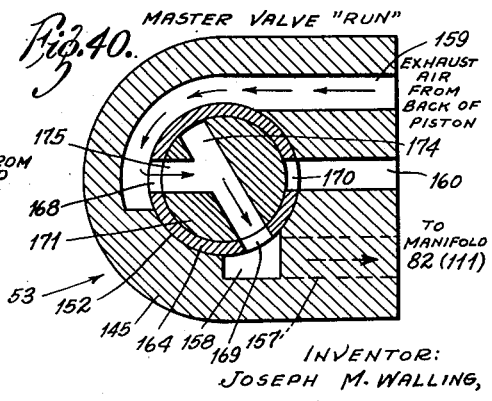

Patented June 13, 1950

2,511,184

UNITED STATES PATENT OFFICE 2,511,184

AUTOMATIC VALVE TIMER

Joseph M. Walling, St. Louis, Mo.

Application May 2, 1947, Serial No. 745,670

24 Claims. (Cl. 60—97)

The present invention relates generally to timing mechanisms, and more particularly to a valve timing apparatus which functions to synchronize into their timed sequence a plurality of valves controlling related machinery or elements of the same machine following a work stoppage or shutdown of the machinery or machine for some reason.

An object of the present invention is to provide a novel valve timing apparatus which is adapted to synchronize the action operations of a plurality of valves following shutdown of the machine or machines, or elements of the machine or machines which the valves control.

Another object is to provide a novel valve timing mechanism which functions to hold in predetermined safe static positions the operated elements of certain cylinders of a machine during a work stoppage while other elements are permitted to continue to function uninterrupted.

Another object is to provide a novel valve timing mechanism in which the cyclic actuation of each valve is individually adjustable, whereby the machine is widely elastic in operation.

Another object is to provide a novel valve timing mechanism which incorporates a master valve which controls a predetermined number of individual cylinder control valves and which may be employed to stop all such controlled cylinders with their operated elements in safe positions, and to permit automatic synchronization of all such controlled cylinders when it is desired to reinitiate operation of the machine of which the valve controlled cylinders are parts.

Another object is to provide a novel valve timing mechanism which is contructed to lend ready accessibility to all operating parts to facilitate such maintenance and repair as may be necessary, but which is ruggedly constructed to reduce to a minimum maintenance and repair.

Another object is to provide a novel valve timing mechanism which is adapted to operate in the fulfillment of its functions over a long period of time in an efficient and accurate manner.

Another object is to provide a novel valve timing mechanism which is particularly adapted to control glass container-making machinery and in which, upon a work stoppage of the controlled glass container-making machinery, the shear cylinder, the tube cylinder, and the trip valve control on the glass-forming machine are permitted to continue to operate, while all other cylinders thereof are stopped with their operated elements in safe positions, hence insuring the safety of the glass container-making machinery and of operating personnel.

Another object is to provide a novel master valve for controlling and synchronizing the operations of cylinders through controlling the actuating air supplied to individual cylinder control valves.

Another object is to provide a novel valve timing mechanism which eliminates a number of valves now used on glass container machinery.

Other objects and advantages in addition to the foregoing are apparent from the following description taken with the accompanying drawings, in which:

Fig. 1 is a front elevational view of a valve timing mechanism formed in accordance with the teachings of the present invention, seven valve assemblies and cam assemblies being shown operatively mounted, space for three more such assemblies being shown as unoccupied;

Fig. 2 is an end elevational view looking from right to left in Fig. 1;

Fig. 3 is a fragmentary vertical transverse cross-sectional view taken substantially on the line 3—3 of Fig. 1;

Fig. 4 is a fragmentary vertical transverse cross-sectional view taken substantially on the line 4—4 of Fig. 1;

Fig. 5 is a fragmentary vertical transverse cross-sectional view taken substantially on the line 5—5 of Fig. 1 showing the piping details of the multi-manifold valve supporting plate;

Fig. 6 is a fragmentary horizontal cross-sectional view taken substantially on the line 6—6 of Fig. 3 showing the master valve in "off" position;

Fig. 7 is an enlarged fragmentary horizontal cross-sectional view taken substantially on the line 7—7 of Fig. 3;

Fig. 8 is an enlarged fragmentary cross-sectional view taken substantially on the line 8—8 of Fig. 3 showing the master valve in "off" position;

Fig. 9 is a plan view of the two members of an adjustable trip pin assembly;

Fig. 10 is an elevational view of a closure plate which closes the rear face of the multi-manifold valve supporting plate and which is disposed between the master valve and the supporting plate;

Figs. 11 and 12 are enlarged vertical cross-sectional views on the lines 11—11 and 12—12, respectively, of Fig. 10;

Fig. 13 is an enlarged top plan view of the multi-manifold valve supporting plate;

Fig. 14 is a front elevational view thereof;

Fig. 15 is a rear elevational view thereof;

Figs. 16 and 17 are enlarged vertical cross-sectional views on substantially the lines 16—16 and 17—17, respectively, of Fig. 14;

Fig. 18 is an enlarged top plan view of the rotor of the master valve;

Fig. 19 is a side elevational view thereof, parts being sectioned to illustrate passages;

Fig. 20 is an enlarged side elevational view of a sleeve which receives the master valve rotor, parts being shown in section;

Fig. 21 is an enlarged rear elevational view partly in section of the master valve body or housing;

Fig. 22 is an enlarged bottom plan view partly in section thereof;

Fig. 23 is a side elevational view of the rotor of a cylinder control valve;

Fig. 24 is an enlarged side elevational view partly in section of a sleeve which receives the cylinder control valve rotor;

Fig. 25 is an enlarged diametric vertical cross-sectional view of a cylinder control valve body or housing;

Fig. 26 is an enlarged side elevational view of an actuating member secured to the lower end of each cylinder control valve rotor for oscillation by the associated trip pins;

Fig. 27 is an enlarged bottom plan view thereof;

Fig. 28 is a fragmentary diagrammatic end elevational view of the valves and supporting plate, to illustrate the passages thereof, which are more particularly shown in the succeeding views, taken on the lines indicated in Fig. 28;

Figs. 29 and 30 are enlarged fragmentary horizontal cross-sectional views taken substantially on the line 29—30 of Fig. 28, illustrating the master valve in "run" and "off" positions, respectively;

Figs. 31 and 32 are enlarged fragmentary horizontal cross-sectional views taken substantially on the line 31—32 of Fig. 28, illustrating the master valve in "run" and "off" positions, respectively;

Figs. 33 and 34 are enlarged fragmentary horizontal cross-sectional views taken substantially on the line 33—34 of Fig. 28 illustrating the two extreme positions of the cylinder control valve to which it is actuated by the associated trip pins when the master valve is in "off" position;

Figs. 35 and 36 are enlarged fragmentary horizontal cross-sectional views taken substantially on the line 33—34 of Fig. 28 illustrating the two extreme positions of the cylinder control valve to which it is actuated by the associated trip pins when the master valve is in "run" position;

Figs. 37 and 38 are enlarged fragmentary horizontal cross-sectional views taken substantially on the line 37—38 of Fig. 28 illustrating the two extreme positions of the cylinder control valve to which it is actuated by the associated trip pins when the master valve is in "off" position; and Figs. 39 and 40 are enlarged fragmentary horizontal cross-sectional views taken substantially on the line 37—38 of Fig. 28 illustrating the two extreme positions of the cylinder control valve to which it is actuated by the associated trip pins when the master valve is in "run" position.

Referring to the drawings more particularly by reference numerals, 50 indicates generally a valve timing mechanism formed to incorporate the concepts of the present invention (Figs. 1 and 2). Broadly, the mechanism 50 includes a support 51, a composite multi-manifold valve supporting panel 52 (Figs. 10-17), a plurality of cylinder control valves 53 (Figs. 1 and 23-25), a master valve 54 (Figs. 2 and 18-22), a composite cam shaft assembly 55 (Figs. 1 and 3), a variable speed motor 56 (Fig. 1), a gear reduction transmission 57 (Fig. 1), a power drive 58 between the gear reduction transmission 57 and the composite cam shaft assembly 55 (Figs. 1 and 2), the necessary piping for the numerous air passages incorporated in the valves 53 and 54 and the panel 52, and essential interconnecting and interrelating elements, all more particularly referred to below.

The support 51 includes spaced end frame bases 60 and 61 which are braced by tie rods 62 and a bottom panel 63, the latter being secured by bolts 64 to projections 65 formed integral with the spaced end frame bases 60 and 61 (Figs. 1 and 2. Superstructure end frames 66 and 67 are mounted on and supported by the frame bases 60 and 61, respectively, being secured thereto by suitable bolts 68, or the like. Additional reenforcing may be employed if desired.

The multi-manifold valve supporting panel 52 is supported between and by the superstructure end frames 66 and 67 by suitable bolts 70 and projections 71 formed integral with the superstructure end frames 66 and 67, as is clear from Figs. 1 and 2. The panel 52 includes a plate 74 which supports the cylinder control valves 53 (Figs. 13-15) and a closure plate 75 (Fig. 10) which supports the master valve 54 which are secured together by suitable bolts 76 (Figs. 3-5) extending through spaced holes 77 in the closure plate 75 into tapped wells 78 in the supporting plate 74 (Fig. 15). A suitable gasket 79 is disposed between the plates 74 and 75 to prevent leakage between the several manifolds and to the exterior (Figs. 3-5).

The cylinder control valve supporting plate 74 is illustrated in detail in Figs. 13 through 17. The plate 74 is of rectangular form and includes two sets A and B of manifolds formed in tiers. The A set of manifolds occupies the right two-thirds of the plate 74 and includes four manifolds 80, 81, 82—82' and 83 formed in the rear face 84 of the plate 74 (Fig. 14). The manifold 82—82' is in two sections in order to give better exhaust capacity than can be obtained from a single manifold for the purpose employed.

Extending through the front face 85 of the plate 74 are seven aligned circular openings 86 which communicate with vertical passages 87 opening into alcoves 88 formed as part of the manifold 80. As presently constructed, the vertical passage 87 is formed by boring from the top face 90 of the plate 74, the upper portion thereof being closed against leakage by a sealing plug 89. Adjacent each opening 86 is another circular opening 92 which communicates with a vertical passage 93 which opens through the top face 90 of the plate 74 and receives a pipe segment 94. Also adjacent each opening 86 on the opposite side from the opening 92 is another circular opening 96 which communicates directly with the manifold 81. Below the openings 86, 92 and 96, which are disposed in substantially the same horizontal plane, are seven circular openings 97, three of which communicate directly with the manifold 82' and four of which communicate directly with the manifold 82. Below the row of openings 97 are seven circular openings 98 which communicate directly with the manifold 83. Adjacent each opening 98 is a circular opening 99 which communicates with a vertical passage 100 which opens through the bottom face 102 of the plate 74 and receives a pipe segment 101. Also communicating with the manifold 83 through the bottom face 102 of the plate 74 is a vertical drain passage 105 which is closed by a plug 106. Two rows of tapped openings 107, twenty in each row, are formed in the front face 85 of the plate 74 for supporting the valves 53, specifically described below. In the rear face 84 are four spaced tapped openings 108 which cooperate with the two tapped openings 78 immediately therebelow for mounting the master valve 54, also described below.

The B set of manifolds located to the left of the A set of manifolds just described (Fig. 14) includes three superposed manifolds 110, 111 and 112 (Fig. 15). The manifold 110 includes three alcoves 113. The manifold 111 includes three vertical passages 114. The manifold 112 includes a drain passage 115 opening into the bottom face 102 of the plate 74 and closed by a plug 116.

Considering the front face 85 of the plate 74, three circular openings 120 therein communicate with vertical passages 121, each of which opens into an alcove 113 of the manifold 110. A plug 122 closes the upper end of the vertical passage 121 above the alcove 113, the passage 121 being formed in the same manner as the above described passages 87. To the right of each opening 120 is a circular opening 123 which communicates with a vertical passage 124 which opens through the upper face 90 of the plate 74 and receives a pipe segment 125. To the left of each opening 120 is a circular opening 127 communicating directly with a vertical passage 114 of the manifold 111. Also communicating directly with the manifold 111 and disposed below the openings 120, 123 and 127 are three openings 128. Below the openings 128 are three circular openings 129 which communicate directly with the manifold 112. Adjacent each opening 129 is a circular opening 130 which communicates with a vertical passage 131 which opens through the bottom face 102 of the plate 74 and receives a pipe segment 132.

The plate 75 which closes the rear face of the plate 74 is shown in Fig. 10 and includes two rectangular openings 135 which communicate with the manifolds 82 and 82', respectively, and an opening 136 which communicates with the manifold 111. Between the two openings 135 are two vertically spaced openings 137 and 138 which communicate with the manifolds 81 and 83, respectively. Openings 139 permit passage of master valve 54 mounting bolts. A main air line opening 140 communicates with the manifold 80. Openings 141 and 142 for air to certain valves 53 open into the manifolds 110 and 112, respectively.

Seven cylinder control valves 53 are shown in Fig. 1 mounted on the front face 85 of the plate 74 of the supporting panel 52. The control valves 53 are identical and are more particularly illustrated in detail in Figs. 8 and 23 through 25. Each control valve 53 includes a housing 145 (Figs. 6-8 and 25) which is preferably cast and of the form and cross section shown and which includes a pair of upper rectangular enlargements 146 and a pair of lower rectangular enlargements 147 (Fig. 2), each having a passage 148 therethrough which receives a bolt 149 threadedly engaging the tapped openings 107 in the front face 85 of the plate 74 to support the valve 53. The housing 145 includes a cylindrical bore 152 into which open horizontal passages 153, 154 and 155 which are in a common horizontal plane, as is clear from Figs. 6 and 25. Each of the passages 153 and 155 opens into the cylindrical bore 152 as an arcuate trough or groove for valving purposes, as is more particularly described below. The passages 153, 154 and 155 are disposed in substantially the same plane with the openings 96, 86 and 92 in the plate 74 and communicate with these openings, respectively, as is shown in Fig. 6. Beneath the aforesaid passages is a passage 157 (Figs. 7 and 25) which opens at one end into the cylindrical bore 152 through a vertical channel 158 in the wall thereof and which communicates at its other end with an opening 97 in the plate 74. Below the passage 157 are passages 159 and 160 which open into the cylindrical bore 152 on a plane with and communicate with the openings 99 and 98, respectively, in the plate 74 (Fig. 8). The passage 159, as do the passages 153 and 155 as aforesaid, opens into the bore 152 as an arcuate channel or groove for valving purposes. The vertical channel 158 extends to just below the plane of the passages 159 and 160. A stop member 162 is formed at the bottom of the housing 145 for a purpose described below.

Within the cylindrical bore 152 is press-fitted or otherwise secured a sleeve 164 having three openings 165, 166 and 167 in the same horizontal plane spaced as shown in Fig. 24, and three openings 168, 169 and 170 in a plane below that of the first-mentioned openings. The relationship of these two sets of openings to the passages in the housing 145 is clearly shown in Figs. 6, 8, 33 and 37. The sleeve 164 rotatably receives a rotor 171 (Fig. 23), which includes a diametrically disposed passage 172 and a passage 173 communicating therewith, as shown in Fig. 6. Below the just mentioned passages, the rotor 171 includes a diametrical passage 174 and a passage 175 opening into the passage 174, as shown in Fig. 8. The rotor 171 includes an upper reduced threaded extension 176 and a lower reduced extension 177.

An actuating member 180 is secured to the extension 177 by a pin 181 (Figs. 1, 3, 26 and 27). The actuating member 180 includes a cylindrical body 182 having an upper flange 183 which fits beneath the sleeve 164 and the bottom surface of the housing 145 to prevent vertical withdrawal of the rotor 171 through the cylindrical bore 152 of the housing 145. Extending outwardly from the lower portion of the body 182 are spaced integral lugs 184 and 185, each of which includes a flat surface 186. The flange 183 has shoulders 187, two of which strike the stop 162 to limit movement of the member 180.

A nut 188 threadedly engages the upper threaded extension 176 of the rotor 171 and bears against a large washer or plate 189 which overlies the upper surface of the housing 145 to suspend the rotor in the housing 145.

The composite cam shaft assembly 55 is located beneath the row of cylinder control valves 53, as is clearly shown in Figs. 1, 2 and 3. The cam shaft assembly 55 includes a solid main central shaft 193 which is journaled in suitable bearings 194 and 195 secured to the end frames 66 and 67, respectively, by suitable bolts 196. Secured to the main shaft 193 at each end adjacent the bearings 194 and 195 by a spline 197 is a cylindrical mounting block 198 which receives against rotation a heavy sleeve 200 of the external form shown in Fig. 1, including pairs of circular grooves 201 spaced by a circular ledge 202. A ledge 203 separates adjacent sets of grooves 201 and ledge 202. A trip pin assembly 205 is mounted in each of the pairs of grooves 201 over which a cylinder control valve 53 is mounted, details of which are shown in Fig. 9. Each trip pin assembly includes split ring halves 206 and 207 having apertured lugs 208 and 209, respectively, which receive screw and bolt assemblies 210 (Fig. 1). A trip pin 211 is formed integral with and extends from a projection 212 formed integral with the ring half 206. Each trip pin assembly 205 is adjustable through 360° in its groove 201 about the shaft 193 as an axis of movement. In one installation, two trip pins 211 oscillate each rotor 171 through 60°, but this arc may vary in different constructions.

The main shaft 193 extends beyond the bearing 195 and has secured thereto a sprocket 215 for rotation therewith (Figs. 1 and 2). A continuous chain 216 is trained about the sprocket 215 and about a sprocket 217 secured to a shaft 218, which extends into the gear reduction transmission 57 and is rotated by suitable gearing therein actuated by the motor 56. An idler wheel 219 pivotally mounted on an arm 200 secured to the frame piece 61 by a bolt 221 maintains the chain 216 taut at all times. Manifestly, the aforesaid elements drive the composite cam shaft assembly 55 at a speed determined by the motor 56 and the reduction transmission 57, a suitable range being 15 to 60 revolutions per minutes.

The master valve 54 includes a housing 225 preferably cast and of the form and cross section shown in the drawings (Figs. 2, 3, 6, 8, 21 and 22). The housing 225 is generally of rectangular shape and includes three horizontal vertically spaced enlargements 226 along one side and three horizontal vertically spaced enlargements 227 along the other side, each of which has a passage 228 therethrough receiving a bolt 229 which extend through openings 139 and adjacent openings 77 in the plate 75 and threadedly engage the four tapped openings 108 and two adjacent tapped openings 78 in the rear face 84 of the plate 74 to mount the master valve 54 in place against the plate 75, as is clearly shown in Figs. 2 and 3. A cylindrical bore 230 extends vertically through the housing 225. An upper vertically elongated opening 231 in the housing 225 opens into the bore 230 at one side and into the opening 137 of the plate 75 at the other side (Figs. 3 and 6). Diametrically opposed to the opening 231 is a chamber 232 which opens into the bore 230 at one side and into a vertical passage 233 at the other side. The passage 233 exhausts to atmosphere (Fig. 3). Below the chamber 232 is a vertically elongated chamber 234 which opens into the bore 230 (Figs. 3, 8 and 22). A horizontal passage 235 leads from the chamber 234 into a pipe segment 236.

A horizontal arcuate channel or groove 237 leads from the chamber 234 away from the passage 235 to the lower end of a vertical channel 238 which extends upwardly beyond the horizontal center of the opening 231 (Figs. 3, 6, 8, and 22). Opposite the chamber 234 is a vertically elongated opening 239 which communicates the bore 230 with the opening 138 in the plate 75. A passage 240 of small diameter communicates the bore 230 with atmosphere.

Press-fitted or otherwise mounted within the cylindrical bore 230 is a sleeve 245 which includes vertically spaced diametrically opposed pairs of elongated openings 246 and 247 (Figs. 3, 20, 29 and 31) and vertically spaced circular openings 248 and 249, the latter being of small diameter (Fig. 20). Rotatably mounted within the sleeve 245 is a rotor 250 having an upper diametrical passage 251 of vertically elongated cross section, radially from which leads a passage 252 (Figs. 6 and 19). Below the passage 251 and in vertical alignment therewith is a diametrical passage 253 of vertically elongated cross section with which radially communicates a passage 254 of small circular cross section. The passage 251 has a cross section which is substantially the same as that of the openings 246, and the passage 253 bears the same relation to the openings 247. The rotor 250 has an upper reduced threaded extension 255 and a lower reduced threaded extension 256. An operating arm 257 having an offset handle 258 is secured to the extension 255 for movement therewith by means of a setscrew, not shown, extending into a provided cavity 259 and maintained in place by a nut 260 engaging the threaded end of the extension 255. The arm 257 is rotatable through an arc of 90° in its control of the rotor 250. An annular plate 261 surrounds the lower extension 256 and extends outwardly beyond the sleeve 245, being maintained in place against the lower face of the housing 225 by a suitable nut 262.

A pipe 265 is connected to each pipe segment 94 by a suitable connecter 266 (Figs. 1 through 3). A manually operable valve 267 is connected in each pipe 265 for selectively individually closing a pipe 265, if desired or necessary. A pipe 265 is also connected to each of the pipe segments 125 by a connector 268, there being a manually operable valve 267 in these pipes 265 also. Similarly, a pipe 269 having a manually operable valve 270 connected therein is connected to each of the pipe segments 101 and 132 by a suitable connector 271. A main air supply pipe 273 is connected into the main air line opening 140 by a connector 274 and pipe segment 275 (Figs. 1, 4 and 10). An air pipe 277 leads to the air line openings 141 and 142 in the plate 75 by means of a joint generally designated 278 (Figs. 1, 5 and 10). A live air supply pipe 279 is connected to the pipe segment 236 leading into the master valve 54 by a suitable connector 280 (Figs. 1 and 2).

Only seven valves 53 are shown mounted on the plate 74 (Fig. 1), three additional places for such valves being illustrated to indicate the elasticity of the mechanism 50. Plugs 285 close the three sets of openings 86, 92, 96, 97, 98 and 99 (Figs. 1 and 14).

*Operation*

From the foregoing detailed description, it is manifest that the present timing mechanism 50 includes four cylinder control valves 53 which are controlled by the master valve 54, and three cylinder control valves 53 which are wholly independent of the master valve 54 and which continue to function as long as the composite cam shaft assembly 55 is rotated and air is supplied to them. It is also clear that the cam shaft assembly 55 moves the actuating member 180 of each valve 53 through its complete cycle of oscillative movement in each rotation of the cam shaft assembly 55, regardless of the position of the master valve 54. It is to be noted that three valves 53, controlled by the master valve 54, have been omitted from the mechanism 50 together with the associated trip pin assemblies 205 to illustrate the fact that all seven valves 53 need not be mounted on the panel 52. Further, it is to be understood that a greater or less number of master valve controlled valves 53 or independently controlled valves 53 may be employed, the supporting panel 52 and related elements being modified accordingly when such obtains.

Assuming that air is being supplied and the motor 56 is energized and rotating the composite cam shaft assembly 55 at a selected speed of rotation, when the master valve 54 is in "run" position the cylinder controlled valves 53 controlled thereby will function to actuate the cylinders controlled thereby, such as the plunger cylinder, the ram cylinder, the swinging funnel cylinder, and the vacuum control cylinder. Figs. 28 through 40 diagrammatically illustrate the several positions of the master valve 54 and the controlled valves 53 in the "run" and "off" positions of the master valve 54.

Figs. 29 and 31 illustrate the position of the master valve rotor 250 and its upper passages 251 and 252 and its lower passages 253 and 254 when the master valve 54 is in "run" position. The upper passage 251 is positioned to exhaust air from the manifold 81 into chamber 232 whence it passes to atmosphere through passage 233 (Figs. 3–6). The lower passage 253 is positioned to supply live air to manifold 83 from the chamber 234 which receives the air from the passage 235, pipe segment 236, the live air supply pipe 279 (Figs. 2 and 8).

The two positions of the rotor of the master valve controlled valves 53, when the master valve is in "run" position, are shown in Figs. 35–36 and 39–40. The positions of the upper passages 172 and 173, when exhausting air from the rod side of the piston controlled thereby, are shown in Fig. 35, and, when supplying air to the rod side of its controlled piston, in Fig. 36.

Considering Fig. 36, the passage 172 of the rotor 171 communicates the manifold 80 and its supply of live air with the rod side of its controlled piston, the passages 154 and 155 being connected by the passage 172, the former communicating with manifold 80 by means of the opening 86 and vertical passage 87 in the plate 74, and the latter with the pipe 265 by means of the opening 92 and the vertical passage 93 in the plate 74 (Figs. 3, 6 and 14). At the same time, as is shown in Fig. 40, the lower passages 174 and 175 exhaust air from the back side of the piston controlled by the presently considered valve 53 to atmosphere, the passage 175 receiving exhausted air from the controlled piston back side by way of the passage 159, the opening 99 and the vertical passage 100 in the plate 74, and the pipe 269, which is in communication with the controlled piston back side (Figs. 3, 8 and 14). The exhausting air passes from the passage 175 into the passage 174, whence it passes into the vertical channel 158 and into the manifold 82 by passage 157 (Figs. 3, 7, 8, 14 and 25).

When the rotor 171 is automatically rotated by the cam shaft assembly 55 to its other position of movement, its aforesaid upper and lower passages assume the positions shown in Figs. 35 and 39, respectively. The upper passages 172 and 173 of the rotor 171 (Fig. 35) are disposed to exhaust air from the rod side of the controlled piston to manifold 81, air returning from the rod side of the controlled piston by way of the pipe 265, the vertical passage 93 and the opening 92 in the plate 74, the passage 155 into the rotor passages 173 and 172, whence it passes to the passage 153 and by way of the opening 96 in the plate 74 to the manifold 81 and to atmosphere (Figs. 3, 6 and 14). Simultaneously, the lower rotor passage 174 communicates the back side of the controlled piston with live air from the manifold 83, the live air passing from manifold 83 through opening 98 in the plate 74 and through the passage 160 into the rotor passage 174, whence it flows into the passage 159 and through the opening 99 and vertical passage 100 in the plate 74 and goes to the back of the controlled piston by way of the pipe 269 (Figs. 3, 8 and 14).

Hence, when the master valve 54 is in "run" position and air is supplied, the cylinder control valves 53 controlled thereby continuously function to supply to and exhaust air alternately from the two ends of the pistons controlled thereby, the rotors 171 being automatically moved to each of their two positions of movement one time in each revolution of the composite cam shaft assembly 55. Should an emergency arise requiring a cylinder controlled by one of the master valve controlled valves 53 to be stopped or should this stoppage be desired through design, the master valve 54 is quickly moved to "off" position by moving the handle 258 through a 90° arc from the position shown in Fig. 29 in broken lines to the position similarly shown in Fig. 30. When the master valve 54 is in "off" position, the valves 53 controlled thereby will function to stop at one end of their strokes the cylinders controlled thereby, and therethrough stop the operated elements in safe positions out of the orbits of moving parts of the machine, for, while the cam shaft assembly 55 will continue to rotate and to oscillate the rotors 171, live air will be continuously supplied to the rod side only of the pistons controlled by the valves 53, regardless of the position of the rotors 171, as is clear from the following explanation.

More specifically, when the master valve 54 is in "off" position, its upper passages 251 and 252 are in the positions shown in Fig. 30, in which positions live air is supplied to manifold 81 from the live air supply pipe 279, the air passing from the pipe 279 through the pipe segment 236 into the horizontal passage 235 across the chamber 234 through the channel 237 upwardly in the channel 238 and into the rotor passage 251 (Figs. 2, 3, 6, 8 and 23). The live air is channeled through the passages 251 and 252 into the passage 231 whence it passes through the opening 137 in the plate 75 into the manifold 81 for supply to the valves 53. At the same time, the lower passages 253 and 254 of the rotor 250 communicate the manifold 83 directly with the bleeder passage 240. Hence, there is no exhaust except leakage through the bleeder passage 240.

Referring to Figs. 33–34 and 37–38, the positions of a master valve controlled cylinder control valve 53 when the master valve 54 is in "off" position are illustrated. In one extreme position of movement of the rotor 171 (Fig. 33), its upper passages 172 and 173 communicate live air in the manifold 81 supplied by the master valve 54, as aforesaid, with the rod side of the piston controlled thereby. Specifically, live air from the manifold 81 passes therefrom into the passage 153 through the opening 96 in the plate 74. Thence, it passes through the rotor passages 172 and 173 into the passage 155, whence it travels to the pipe 265 after passing through the opening 92 and the passage 93 in the plate 74. At the same time, the lower rotor passages 174 and 175 are in the position shown in Fig. 37. Due to the positions of the lower passages 253 and 254 of the rotor 250 of the master valve 54, as is shown in Fig. 32, no live air is being supplied into the passage 160 from the manifold 83 and master valve 54. Hence, captured air in the line to the back of the controlled piston, above described, may bleed out through the bleeder passage 240 (Fig. 32).

The other extreme position of movement of the rotor when the master valve is in "off" position is shown in Figs. 34 and 38. Referring to Fig. 34, the upper rotor passage 172 communicates the manifold 80 and its continuous supply of air from the pipe 273 (Fig. 4) with the rod side of the piston controlled by the valve 53. Live air from the manifold 80 passes by way of the vertical passage 87 and the opening 86 in the plate 74 into the passage 154, whence it passes through the rotor passage 172, the housing passage 155, and the opening 92 and the vertical passage 93 in the plate 74 to and through the pipe 265 to the rod side of the piston controlled by the valve 53. At the same time, the lower rotor passages 174 and 175 are in the positions shown in Fig. 38, whereby the back side of the piston controlled by the valve 53 is in communication with the manifold 82, but there is no exhaust of air since there is no movement of the controlled piston, as is clear from the foregoing explanation. However, any captured or leakage air may pass directly to manifold 82.

Manifestly, therefore, while the master valve 54 is in its "off" position, the cylinder control valves 53 controlled thereby continuously supply live air only to the rod side of the pistons controlled thereby, regardless of the positions of the rotors 171 which continue to oscillate. Such position of the controlled cylinders is considered to be the safe position thereof, and the same are positively maintained in this safe position while the master valve is in "off" position, thereby preventing possible damage to the equipment involved and injury to personnel doing repair work or otherwise about the machinery controlled by the timing mechanism 50.

The present timing mechanism 50 is particularly adapted to use with glassware-making machinery. In such machinery, it is desirable that the shear cylinder, the tube cylinder, and the trip control valve operating the trip valve on the glass forming machine continue to operate even though other elements of the glassware-making machinery may be rendered inoperative for one reason or another. The present timing mechanism 50 makes provision for this situation in that the three valves 53 at the left of the panel 52 (Fig. 1) are not controlled by the master valve 54 and are in no wise affected thereby. These three valves 53 continue to function to actuate the respective controlled pistons so long as the composite cam shaft assembly 55 rotates and air is supplied through pipe 277 (Fig. 5). In connection with the operation of the three valves 53 not controlled by the master valve 54, it is to be noted that the manifold 81 employed with the master valve controlled valve 53 is not used. The functioning of the three independent valves 53 is clear from an inspection of Figs. 35-36, 39-40 taken in conjunction with Figs. 3, 5 through 8, and 13 through 15. One extreme position of movement of the rotor 171 is shown in Figs 35 and 39, and the other in Figs 36 and 40, these views illustrating the positions of the rotors 171 of the independent valves 53 as well as those of the master valve controlled valves 53.

Considering Fig. 35, the upper rotor passages 172 and 173 communicate the rod side of the controlled piston with the manifold 111 for exhaust of the air which had previously been introduced to the rod side of the piston. The air travels from the rod side of the piston through the pipe 265, the pipe segment 125, the vertical passage 124 and the opening 123 in the plate 74 (Fig. 14), the passage 155, the rotor passages 173 and 172, the passage 153, the opening 127 and the vertical passage 114 in the plate 74, and into the manifold 111, whence it exhausts through the opening 136 in the plate 75 to atmosphere. At the same time, the lower rotor passage 174 (Fig. 39) communicates live air in the manifold 112 with the back of the controlled piston. Specifically, live air in the manifold 112, which is supplied by means of the pipe 277 and the lower part of the connection 278 (Fig. 5), passes from the manifold 112 through the opening 129 in the plate 74 (Fig. 14) into the passage 160, through the rotor passage 174 and the housing passage 159 through the opening 130 and the vertical passage 131 of the plate 74, whence it passes to the back of the control piston by the pipe 269.

In the other extreme position of movement of the rotor 171 of the independent valves 53, the upper rotor passages 172 and 173 are as shown in Fig. 36 and communicate live air from the manifold 110 to the rod side of the controlled piston. Specifically, live air in the manifold 110, which is supplied from the air supply pipe 277 (Fig. 5), passes from the manifold 110 into the alcove 113 thereof, whence it passes to the housing passage 154 by way of the vertical passage 121 and opening 120 in the plate 74, then through the rotor passage 172, the housing passage 155 through the opening 123 and the vertical passage 124 of the plate 74 into the pipe 265 and to the rod side of the controlled piston. At the same time, the lower rotor passages 174 and 175 communicate the back side of the piston with the exhaust manifold 111 to exhaust air previously supplied. Specifically, air from the back side of the controlled piston passes by way of the pipe 269 through the vertical passage 131 and the opening 130 of the plate 74 into the housing passage 159 through the rotor passages 175 and 174 into the vertical passage 158, the horizontal passage 157, through the opening 128 in the plate 74 and into the manifold 111, whence it exhausts to atmosphere through the exhaust opening 136 in the plate 75.

As is mentioned above, there is provided for each of the manifolds 83 and 112 a drain passage 105 and 115, respectively, closed by plugs 106 and 116, respectively, in order to drain any accumulation of oil which may at times collect in these manifolds, since a lubricant in the form of a satisfactory oil is added to the live air in order to lubricate the entire system.

The composite cam shaft assembly 55 is adjustable in respect to the trip assemblies 205. An individual trip assembly 205 may be moved to any position after loosening the securing screw and nut assemblies 210. A 360° adjustment is manifestly possible with each trip assembly 205, which makes the present timing mechanism 50 highly elastic. A particular cylinder control valve 53 may be moved to its extreme positions of oscillative movement at any selected points of rotation of the cam shaft assembly 55. The speed of the cam shaft 55 may be varied as desired either through modifying the reduction transmission 57 or by controlling the variable speed motor 56 through a rheostat, or the like.

The present timing mechanism 50 synchronizes all master valve controlled elements with each other and with the independent elements within one rotation of the cam shaft assembly 55 after the master valve is moved from "off" to "run" position. Once the elements controlled by the master valve controlled valves 53 are properly timed in respect to each other, this synchronization is not lost by a shutdown of the machinery or a work stoppage. Maximum speed in resuming operations after a stoppage or shutdown is obtained with a minimum of danger of damage to the forming machine and injury to personnel.

A control valve 53 may be used to spray lubricants into various places on the glass forming machine, such as the guide tube, blank molds, shear blades, etc., with correct timing, thereby minimizing the consumption of material.

It is manifest there has been provided a timing mechanism which fulfills all of the objects and advantages sought therefor.

It is to be understood that the foregoing description and the accompanying drawings have been given by way of illustration and example. It is also to be understood that changes in form of the several parts, substitution of equivalent elements, and rearrangement of parts, which will be readily apparent to one skilled in the art, are contemplated as within the scope of the present invention, which is limited only by the claims which follow.

What is claimed is:

1. In combination, timed control mechanism including a master valve having "run" and "off" positions, a plurality of device control valves operatively connected thereto each adapted to control the passage of air to and the exhaust of air from a fluid operated device, continuously operable means for cyclically actuating said device control valves, and air supply means, said device control valves passing air from said air supply means for device cycle actuation when said master valve is in "run" position and for device restraint in one position after movement thereto when said master valve is in "off" position.

2. In combination, a master valve having "run" and "off" positions, a plurality of oscillative device control valves, supporting means for all of said valves, means for continuously oscillating said device control valves, operating air supply means, and means for continuously delivering air from said air supply means from one side of said device control valves when said master valve is in "off" position regardless of the positions of said device control valves.

3. In combination, a panel including a plurality of manifolds, a master valve operatively mounted thereon having "run" and "off" positions, a plurality of fluid motor control valves operatively mounted thereon, cycling means for continuously actuating said fluid motor control valves to effect reciprocation of the pistons of controlled fluid motors, separate operating fluid supply means to at least one manifold and to the master valve, and means interconnecting said master valve and certain of said fluid motor control valves through said panel for supplying operating fluid through said certain fluid motor control valves from said manifold or said master valve to one end only of the pistons of controlled fluid motors regardless of the position of the said certain fluid motor control valves when said master valve is in "off" position.

4. In combination, a master valve having "run" and "off" positions, a plurality of device control valves controlled by said master valve, means supporting said master valve and said device control valves, means for supplying air to said master valve, means for supplying air to said device control valves, and air passage connecting means between said master valve and said device control valves so arranged that in a "run" position of said master valve said device control valves function to alternately supply and exhaust air from controlled devices and in an "off" position of said master valve said device control valves function to continuously supply air to controlled devices.

5. In combination, a master valve having "run" and "off" positions, a plurality of device control valves controlled by said master valve, each device control valve including a movable member, means supporting said master valve and said device control valves, means for supplying air to said master valve, means for supplying air to said device control valves, means for oscillating said movable members continuously, and air passage connecting means between said master valve and said device control valves so arranged that in a "run" position of said master valve said device control valves function to alternately supply and exhaust air from controlled devices and in an "off" position of said master valve said device control valves function to continuously supply air to controlled devices.

6. In combination, a master valve having "run" and "off" positions, a plurality of fluid motor control valves controlled by said master valve, each fluid motor control valve including a movable rotor member having two positions of operation, means supporting said master valve and said fluid motor control valves, means for supplying air to said master valve, means for supplying air to said fluid motor control valves, and air passage connecting means between said master valve and said fluid motor control valves so arranged that in a "run" position of said master valve said fluid motor control valves function to alternately supply and exhaust air from the ends of the pistons of their controlled fluid motors in the two positions of operation of the rotor members and in an "off" position of said master valve said fluid motor control valves function to continuously supply air to one end only of the pistons of their controlled fluid motors in the two positions of operation of the rotor members.

7. In combination, a master valve having "run" and "off" positions, a plurality of fluid motor control valves controlled by said master valve, each fluid motor control valve including a movable rotor member having two positions of operation, means supporting said master valve and said fluid motor control valves, means for supplying air to said master valve, means for supplying air to said fluid motor control valves, means for continuously moving said rotor members oscillatively from one position of operation to the other, and air passage connecting means between said master valve and said fluid motor control valves so arranged that in a "run" position of said master valve said fluid motor control valves function to alternately supply and exhaust air from the ends of the pistons of their controlled fluid motors in the two positions of operation of the rotor members and in an "off" position of said master valve said fluid motor control valves function to continuously supply air to one end only of the pistons of their controlled fluid motors in the two positions of operation of the rotor members.

8. In combination, a master valve having "run" and "off" positions, a plurality of oscillative device control valves, supporting means for all of said valves, means for continuously oscillating said device control valves, operating air supply means, and means for continuously delivering air from one side of said device control valves when said master valve is in "off" position regardless of the positions of said device control valves, said continuously oscillating means including means for oscillating said device control valves in timed relation so that synchronization obtains for devices controlled by said device control valves within one cycle after the master valve is moved to "run" position.

9. In combination, a master valve having "run" and "off" positions, a plurality of device control valves, means supporting said master valve and said device control valves, means for continuously oscillating said device control valves between two operative positions, means for supplying air under pressure to said master valve, means for supplying air under pressure to said device control valves, means for channeling the master valve air to said device control valves for passage into one control line when the master valve is in "run" position, and means for channeling the master valve air to said control valves for passage into a second control line when the master valve is in "off" position.

10. In combination, a master valve having "run" and "off" positions, a plurality of device control valves, means supporting all of said valves, means for supplying air to said master valve, means for supplying air to said device control valves, air passage means connecting said master valve and said device control valves, and means for continuously oscillating said device control valves between two extreme positions of operation for cyclically actuating devices controlled thereby, said device control valves being effective under oscillation by said oscillating means to actuate devices in predetermined cycles when said master valve is in "run" position, said device control valves being effective in all operative positions under oscillation by said oscillating means to move controlled devices to and hold them in one position of movement when said master valve is in "off" position.

11. In combination, timing mechanism comprising a panel including a plurality of manifolds, a master valve having "run" and "off" positions supported on one side of said panel, a plurality of device control valves each including a movable member supported on the other side of said panel, passages connecting said master valve with certain of said manifolds, passages connecting said device control valves with all of said manifolds, means for supplying live air to one manifold, means for supplying live air to said master valve, means for passing the live air supplied to said master valve to one outlet of each of said device control valves when said master valve is in "run" position and to another outlet thereof when said master valve is in "off" position, said second mentioned outlets of the device control valves being those outlets receiving live air supplied to said one manifold, and means for continuously oscillating the movable members of said device control valves in timed relation.

12. In combination, timing mechanism comprising a panel including a plurality of manifolds, a master valve having "run" and "off" positions supported on one side of said panel, a plurality of device control valves each including a movable member supported on the other side of said panel, passages connecting said master valve with certain of said manifolds, passages connecting said device control valves with all of said manifolds, means for supplying live air to one manifold, means for supplying live air to said master valve, means for passing the live air supplied to said master valve to one outlet of each of said device control valves when said master valve is in "run" position and to another outlet thereof when said master valve is in "off" position, said second mentioned outlets of the device control valves being those outlets receiving live air supplied to said one manifold, and means for continuously oscillating the movable members of said device control valves in timed relation including an actuating member secured to each movable member, a composite cam shaft including a pair of trip pin assemblies operatively associated with each actuating member, and means for continuously rotating said shaft at a constant speed.

13. In combination, timing mechanism comprising a panel including a plurality of manifolds, a master valve having "run" and "off" positions supported on one side of said panel, a plurality of device control valves each including a movable member supported on the other side of said panel, passages connecting said master valve with certain of said manifolds, passages connecting said device control valves with all of said manifolds, means for supplying live air to one manifold, means for supplying live air to said master valve, means for passing the live air supplied to said master valve to one outlet of each of said device control valves when said master valve is in "run" position and to another outlet thereof when said master valve is in "off" position, said second mentioned outlets of the device control valves being those outlets receiving live air supplied to said one manifold, and means for oscillating the movable members of said device control valves in timed relation including an actuating member secured to each movable member, a composite cam shaft including a pair of trip pin assemblies operatively associated with each actuating member, and means for rotating said shaft.

14. In combination, timing mechanism comprising a panel including a plurality of manifolds, a master valve having "run" and "off" positions supported on one side of said panel, a plurality of device control valves each including a movable member supported on the other side of said panel, passages connecting said master valve with certain of said manifolds, passages connecting said device control valves with all of said manifolds, means for supplying live air to one manifold, means for supplying live air to said master valve, means for passing the live air supplied to said master valve to one outlet of each of said device control valves when said master valve is in "run" position and to another outlet thereof when said master valve is in "off" position, said second mentioned outlets of the device control valves being those outlets receiving live air supplied to said one manifold, and means for oscillating said movable members and for synchronizing the operation of said device control valves within a predetermined minimum operational period after said master valve is moved from "off" position to "run" position.

15. In combination, a master valve having "run" and "off" positions, a plurality of device control valves controlled as a group by said master valve, a plurality of device control valves independent of said master valve, means for supplying air under pressure to all of said valves, means interconnecting said master valve and said master valve controlled device control valves so that the latter are inoperative to reciprocate the pistons of controlled devices to which they are adapted to be operatively connected when the former is in "off" position, and means for oscillating both sets of device control valves between their two operating positions regardless of the position of said master valve.

16. In combination, a master valve having "run" and "off" positions, a plurality of device control valves controlled as a group by said master valve, a plurality of device control valves independent of said master valve, means for supplying air under pressure to all of said valves, means interconnecting said master valve and said master valve controlled device control valves so that the latter are inoperative to reciprocate the pistons of controlled devices to which they are adapted to be operatively connected when the former is in "off" position, and means for continuously oscillating both sets of device control valves between their two operating positions regardless of the position of said master valve.

17. In combination, a master valve having "run" and "off" positions, a plurality of device control valves controlled as a group by said master valve, a plurality of device control valves independent of said master valve, a panel having two sets of manifolds, said master valve and control valves controlled thereby being mounted on said panel in operative relation to one set of manifolds and said other control valves being mounted on said panel in operative relation to the other set of manifolds, means for supplying air under pressure to all of said valves, means interconnecting said master valve and said master valve controlled device control valves so that the latter are inoperative to reciprocate the pistons of controlled devices to which they are adapted to be operatively connected when the former is in "off" position, and means for continuously oscillating both sets of device control valves between their two operating positions regardless of the position of said master valve.

18. In combination, a master valve having "run" and "off" postions, a plurality of device control valves controlled as a group by said master valve, a plurality of device control valves independent of said master valve, means for supplying air under pressure to all of said valves, means interconnecting said master valve and said master valve controlled device control valves so that the latter are inoperative to reciprocate the pistons of controlled devices to which they are adapted to the operatively connected when the former is in "off" position, and means for continuously oscillating both sets of device control valves between their two operating positions regardless of the position of said master valve, said last means including a rotatable cam shaft supporting two trip cams for each valve of said two sets of device control valves and means connected to each valve contactable by said trip cams to oscillate said valves, said last means being adapted to synchronize said two sets of device control valves after a work stoppage or machine shutdown.

19. In combination, timing mechanism comprising a panel including a first and a second set of manifolds, a master valve including "run" and "off" positions supported on one side of said panel, a first group of device control valves each including a movable member supported on the other side of said panel and communicating with said first set of manifolds, a second group of device control valves each including a movable member supported on said other side of said panel and communicating with said second set of manifolds, passage means connecting said master valve with certain of the manifolds of said first set, means for supplying live air to one manifold of said first set, means for supplying live air to at least two manifolds of said second set, means for supplying live air to said master valve, and means for continuously oscillating in timed relation the movable members of the device control valves of both groups, the device control valves of said first group being interconnected with the manifolds of said first set and with said master valve to cycle devices controlled thereby when said master valve is in "run" position and to hold devices controlled thereby in one position of movement when said master valve is in "off" position.

20. In combination, timing mechanism comprising a panel including a first and a second set of manifolds, a master valve including "run" and "off" positions supported on one side of said panel, a first group of device control valves each including a movable member supported on the other side of said panel and communicating with said first set of manifolds, a second group of device control valves each including a movable member supported on said other side of said panel and communicating with said second set of manifolds, passage means connecting said master valve with certain of the manifolds of said first set, means for supplying live air to one manifold of said first set, means for supplying live air to at least two manifolds of said second set, means for supplying live air to said master valve, and means for continuously oscillating in timed relation the movable members of the device control valves of both groups, the device control valves of said first group being interconnected with the manifolds of said first set and with said master valve to cycle devices controlled thereby when said master valve is in "run" position and to hold devices controlled thereby in one position of movement when said master valve is in "off" position, said oscillating means including a rotatable cam shaft having trip members for continuously oscillating the movable members of the device control valves of both groups, so that all device control valves are synchronized within one rotation of said cam shaft after the master valve is moved from "off" to "run" position.

21. In combination, a master valve having "run" and "off" positions, a plurality of device control valves, means supporting said master valve and said device control valves, means for continuously moving said device control valves between two operative positions, means for supplying air under pressure to said master valve and to said device control valves, means for channeling the master valve air to said device control valves for passage into one control line when the master valve is in "run" position, and means for channeling the master valve air to said control valves for passage into a second control line when the master valve is in "off" position.

22. In combination, a master valve having "run" and "off" positions, a plurality of device control valves, each device control valve including a rotatable member having air passages, means supporting said master valve and said device control valves, means for continuously moving said rotatable members of said device control valves between two operative positions, means for supplying air under pressure to said master valve, means for supplying air under pressure to said device control valves, means for channeling the master valve air to said device control valves for passage into one control line when the master valve is in "run" position, and means for channeling the master valve air to said control valves for passage into a second control line when the master valve is in "off" position.

23. In combination, a master valve having "run" and "off" positions, a plurality of device control valves, each device control valve including a rotatable member having air passages, means supporting said master valve and said device control valves, means for continuously moving said rotatable members of said device control valves between two operative positions including a rotatable shaft having trip assemblies adjustably secured thereto adapted to move said rotatable members through predetermined arcs, means for supplying air under pressure to said master valve, means for supplying air under pressure to said device control valves, means for channeling the master valve air to said device control valves for passage into one control line when the master valve is in "run" position, and means for channeling the master valve air to said control valves for passage into a second control line when the master valve is in "off" position.

24. In combination, a master valve having "run" and "off" positions, a plurality of device control valves, means supporting said master valve and said device control valves, means for continuously oscillating said device control valves between two operative positions, means for supplying air under pressure to said master valve, means for supplying air under pressure to said device control valves, means for channeling the master valve air to said device control valves for passage into one control line when the master valve is in "run" position, and means for channeling the master valve air to said control valves for passage into a second control line when the master valve is in "off" position, said means for continuously oscillating said device control valves comprising means for synchronizing said device control valves within one cycle after the master valve is moved to "run" position after a shutdown.

JOSEPH M. WALLING.

No references cited.